United States Patent
Serceki et al.

(10) Patent No.: US 7,321,784 B2
(45) Date of Patent: Jan. 22, 2008

(54) METHOD FOR PHYSICALLY UPDATING CONFIGURATION INFORMATION FOR DEVICES IN A WIRELESS NETWORK

(75) Inventors: Zeljko John Serceki, Santa Rosa, CA (US); Rian D. Sanderson, Santa Rosa, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1159 days.

(21) Appl. No.: 10/000,982

(22) Filed: Oct. 24, 2001

(65) Prior Publication Data

US 2003/0078072 A1 Apr. 24, 2003

(51) Int. Cl.
*H04B 1/38* (2006.01)

(52) U.S. Cl. .................. 455/557; 455/558; 455/550.1; 455/556.1; 455/556.2; 709/220; 709/221; 709/222

(58) Field of Classification Search ................ 455/419, 455/41.3, 557, 558, 418, 420, 410, 411, 550.1; 455/556.1–556.2, 575.6; 709/220, 221, 222; 379/161, 189; 380/247, 250; 235/380, 439
See application file for complete search history.

(56) References Cited

U.S. PATENT DOCUMENTS

| | | | |
|---|---|---|---|
| 5,859,522 A * | 1/1999 | Theobald .................... 320/106 |
| 6,016,476 A * | 1/2000 | Maes et al. ..................... 705/1 |
| 6,131,119 A * | 10/2000 | Fukui .......................... 709/224 |
| 6,657,538 B1 * | 12/2003 | Ritter ......................... 340/5.81 |
| 6,961,587 B1 * | 11/2005 | Vilppula et al. ............. 455/558 |
| 7,076,623 B1 * | 7/2006 | Ito et al. ...................... 711/163 |
| 2002/0075800 A1 * | 6/2002 | Iwase et al. ................. 370/230 |
| 2002/0104069 A1 * | 8/2002 | Gouge et al. ............... 717/107 |
| 2002/0138754 A1 * | 9/2002 | Himeno ...................... 713/200 |
| 2002/0178295 A1 * | 11/2002 | Buczek et al. .............. 709/250 |
| 2003/0036876 A1 * | 2/2003 | Fuller et al. ................ 702/127 |
| 2003/0051075 A1 * | 3/2003 | Purpura .......................... 710/1 |
| 2003/0078036 A1 * | 4/2003 | Chang et al. ............... 455/419 |
| 2003/0204574 A1 * | 10/2003 | Kupershmidt ............... 709/220 |
| 2004/0160953 A1 * | 8/2004 | Banks et al. ................ 370/386 |

FOREIGN PATENT DOCUMENTS

WO    WO 00/42491    *    7/2000

* cited by examiner

*Primary Examiner*—Rafael Perez-Gutierrez
*Assistant Examiner*—Khai Nguyen
(74) *Attorney, Agent, or Firm*—Steven A. Shaw; W. James Brady; Frederick J. Telecky, Jr.

(57) ABSTRACT

A method for providing configuration information for use in installing a new wireless station to a wireless network that minimizes errors is presented. The configuration information is distributed by storing the configuration information onto a device with a memory and then distributing the device to the users interested in installing new wireless stations. The device is attached to a computer to which the wireless station is coupled, initiating a transfer of the configuration information. The computer uses the configuration information to configure the wireless station. The method also provides a way to limit access to the configuration information through the use of encryption and limiting the number of times the configuration information is retrieved. The method is also an effective way to distribute security keys for encryption systems whose purpose is to secure communications in a wireless network.

27 Claims, 2 Drawing Sheets

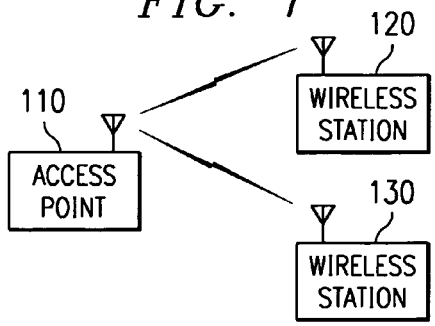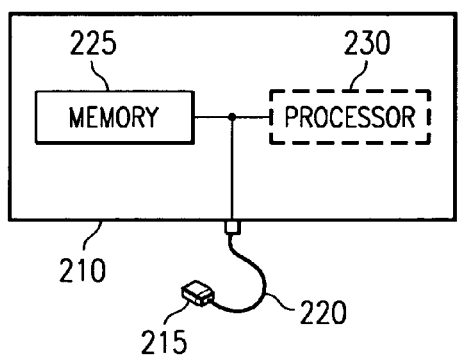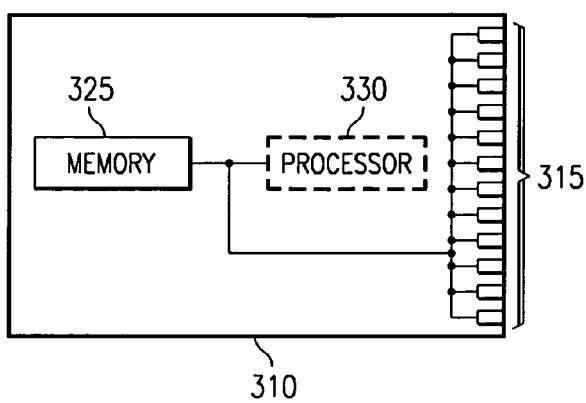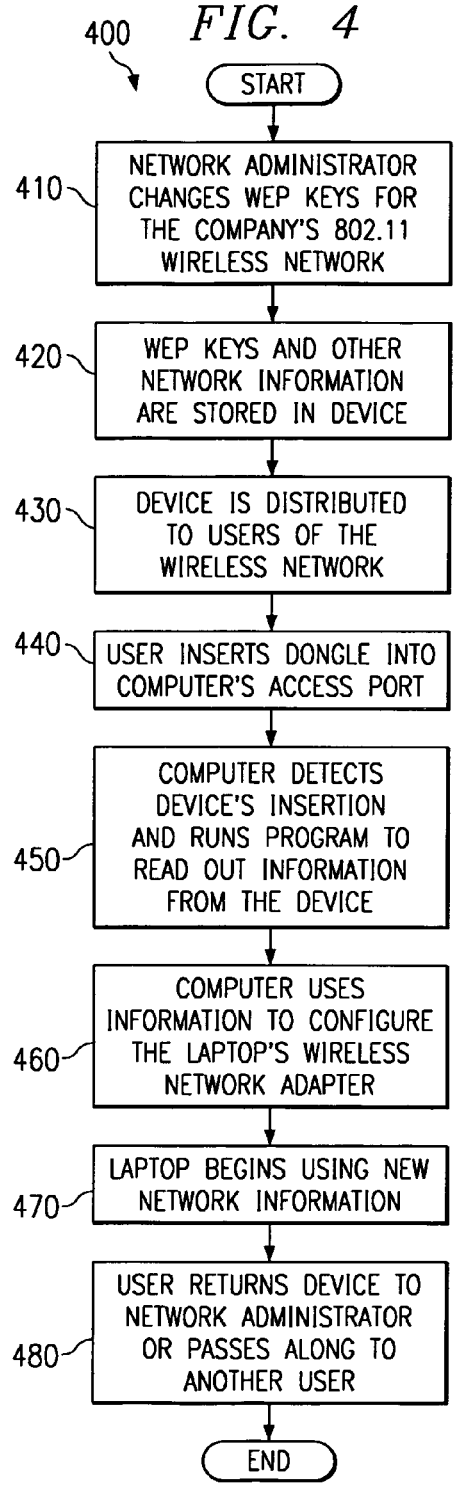

METHOD FOR PHYSICALLY UPDATING CONFIGURATION INFORMATION FOR DEVICES IN A WIRELESS NETWORK

FIELD OF THE INVENTION

This invention relates generally to wireless networks, and particularly to exchanging configuration information of wireless networks using a physical medium for the data transfer.

BACKGROUND OF THE INVENTION

Wireless networks provide a high level of convenience for their users. Once the wireless networks are properly configured, users can roam freely within the coverage area of the wireless network without being encumbered by network connections. Additionally, installation of wireless networks does not require extensive drops of expensive network cabling.

However, configuring and installing a wireless network is not necessarily a simple task. Because the communications medium for a wireless network is typically "air", communications from multiple wireless networks may be present on the communications medium simultaneously within a given location. Unique network identifiers are used to distinguish transmissions from one wireless network over another. A typical installation scenario may require that the installer manually input the unique network identifier into the installation program, along with other required information, such as client address, client name, network address, network name, etc. Manual data entry of this extensive list of information is at the very least tedious and error prone. Manual data entry also limits the number of installations that can be performed in a day. Compare this to the installation of a typical wired network, where configuration and installation has become as simple as plugging an active network drop into a network interface card installed on a computer and having the computer automatically adding itself to the network and configuring itself.

One solution to the installation problem involves the use of a set of default values. Through the use of default values, wireless networks can automatically configure themselves during the initially power-on after the components have been installed. However, default values do not work very well when there are multiple wireless networks of the same type operating in a given location, due to transmission conflicts between the networks and the confusion that results. Additionally, default values present security issues that are open to exploitation by anyone who knows of their use. For example, a disgruntled employee with knowledge of the default values may simply park his car outside of the business location and turn his computer and is given full access of the business' computer system.

Another problem facing wireless networks is the inherent insecurity of their transmissions. A motivated person with electronic surveillance equipment can capture the transmissions and can obtain access to the information in the transmissions. A solution provided for securing communications on a wireless network is to use a built-in security/encryption mechanism, such as Wired Equivalent Privacy (WEP) used in IEEE 802.11 wireless local area networks. However, WEP and many other security mechanisms require that security keys be manually inputted during installation or updates. This leads to distribution of the security keys via electronic mails with the security keys included in them, or the security keys are written down on pieces of paper. Such unsecured methods of security key distribution severely weakens the security system because persons not authorized for access to the security keys may be able to obtain the keys, often times by simply taking a piece of paper out of a waste-paper basket.

A need has therefore arisen for a method to provide easy exchange of configuration information and at the same time, provide a measure of security for the information.

SUMMARY OF THE INVENTION

The preferred embodiment of the invention provides a way to distribute configuration information to wireless stations via the use of a device that stores the configuration information in memory. When a user is provided the device, he/she can connect it to a computer that is connected to the wireless station and the computer will read out the configuration information and configure the wireless station so that it will be able to operate in a wireless network. The device can also be used to distribute encryption keys for the wireless network, along with whatever information deemed important.

In one aspect, the present invention provides a method for physically exchanging configuration information and/or encryption keys in a wireless network for use in configuring wireless station comprising saving the configuration information and/or encryption keys onto a physical device, coupling the physical device to a wireless station, initiating the download of the information stored on the physical device and using the configuration information to configure the wireless station that is coupled to the digital device.

The present invention provides a number of advantages. For example, use of the preferred embodiment reduces the change of errors by electronic distribution of configuration. Because of this, the manual entry of complex information is not required, thus reducing the chance of errors.

Also, because the methods are simple, security information is more likely to be updated frequently. Other methods that are tedious and/or cumbersome are likely to be neglected.

Aspects of the present invention that utilizes electronic transfer of configuration information have the advantage that a layer of security can be added to the configuration and security information. This additional layer of security helps prevent unauthorized users from obtaining access to the information.

BRIEF DESCRIPTION OF THE DRAWINGS

The above features of the present invention will be more clearly understood from consideration of the following descriptions in connection with accompanying drawings in which:

FIG. 1 displays a typical implementation of a wireless network;

FIG. 2 displays a device for exchanging configuration information according to a preferred embodiment of the present invention;

FIG. 3 displays another device for exchanging configuration information according to a preferred embodiment of the present invention;

FIG. 4 displays a flow diagram of a typical sequence of steps involved in the distribution and updating of security keys in a wireless network according to a preferred embodiment of the present invention.

DETAILED DESCRIPTION OF ILLUSTRATIVE EMBODIMENTS

Figure 5A:
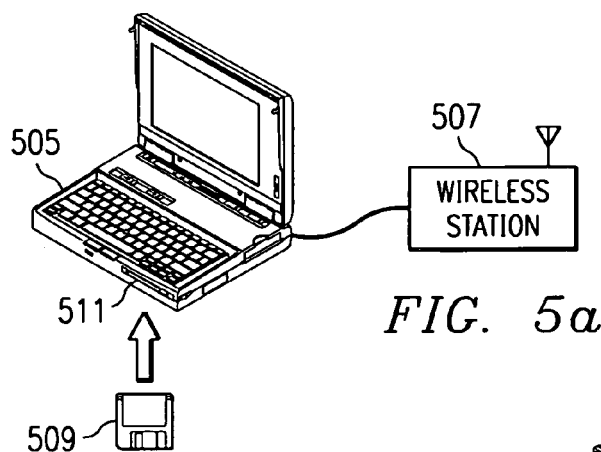
FIG. 5a-d display various embodiments of the present invention for a device for exchanging configuration information.

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Networks adhering to the IEEE 802.11 technical standard and its more advanced version, IEEE 802.11b, are among the most widely available wireless networks today. The IEEE 802.11b wireless network operates in the 2.4 GHz Industrial, Scientific, and Medial (ISM) radio frequency (RF) spectrum band and provides up to 11 Mbps of data transfer rate. The IEEE 802.11 wireless network is specified in a technical standard document, "ANSI/IEEE Std 802.11, 1999 Edition; Information technology—Telecommunications and information exchange between systems—Local and metropolitan area networks—Specific requirements. Part 11: Wireless LAN Medium Access Control (MAC) and Physical Layer (PHY) Specifications," which is incorporated herein by reference. The IEEE 802.11b wireless network is specified in a supplement to the IEEE 802.11 technical standard, "IEEE Std 802.11b-1999 (Supplement to ANSI/IEEE Std 802.11, 1999 Edition) Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band" which is also incorporated herein by reference.

For discussion purposes, the focus of this specification is mainly on wireless communications networks that are adherent to the IEEE 802.11 technical standard and uses personal computers. However, the ideas presented in the preferred embodiments of the present invention have applicability in other networks where a client must be configured with various pieces of configuration information before they can begin operation. Therefore, the present invention should not be construed as being limited to only IEEE 802.11 wireless networks. Examples of such networks include HomeRF, Hiperlan, and other wireless networks that require a client be configured with information or be updated periodically with security information.

Referring now to FIG. 1, a diagram (prior art) of a typical wireless network configuration according to the 802.11 technical standard. Note that FIG. 1 displays one possible configuration of an 802.11 wireless network out of the many different configurations that are possible. FIG. 1 illustrates a wireless network 100 comprising an access point 110 that is wirelessly connected to a first wireless station 120 and a second wireless station 130. The access point 110 can be viewed as a controller of communications taking place within the wireless network 100.

Prior to use, a wireless station should be configured with a unique network identifier that is used to identify communications within the wireless network. All communications within a wireless network controlled by the access point 110 are so labeled so that other access points and wireless stations will be able to identify the origination of such communications. In addition, other configuration information such as device addresses, device names, network addresses, network names, domain names, subnet masks, etc. are required for the proper integration of the wireless station into the existing wireless network.

If the wireless network uses an encryption mechanism, such as Wired Equivalent Privacy (WEP) in an IEEE 802.11 wireless network, to help increase security in the network, then the security keys should also be entered during the installation process. Security keys are typically long, random strings of alphanumeric characters, making them very difficult to remember and to accurately enter. Such security keys are usually distributed by emails, written down on pieces of paper, or known only to authorized personnel. Distribution by email or pieces of paper is very insecure since emails are easily intercepted and paper can be readily retrieved from trash bins. If the security keys are limited to only a small number of people, then the installation of new wireless stations is limited to how many stations these trusted people can attend to.

Such distribution methods also make it very difficult to update the configuration information and the security keys, since it takes so long to perform the changes. The inertia and inherent inefficiencies in the system make it very easy to neglect updating the security keys, therefore, jeopardizing the security of the wireless network.

Rather than requiring the installer to enter all of this information or having an information systems support staff member perform all of the installations, the configuration information may be stored on a device that can be passed around to various users who are installing wireless stations. The user would then only need to install the hardware portion of the wireless station and when prompted for configuration information, connect the device to the personal computer or the wireless station and the configuration information would be automatically provided to the installation software, negating manual entry of the configuration information. Alternatively, after installing the hardware portion of the wireless station, the user can connect the device to the personal computer or the wireless station and the software installation initiates automatically upon detection of the connection of the device.

Referring now to FIG. 2, a diagram illustrates a device 200 for use in physically exchanging network configuration information in a wireless network according to a preferred embodiment of the present invention. The device 200 comprises a storage unit 210 and a connector 215. A cable 220 connects the storage unit 210 to the connector 215. Additional glue logic and interface logic for providing interoperability between the device 200 and the personal computer that the device 200 connects to is not shown in FIG. 2. It is understood, however, that such logic is typically necessary for proper functionality of the device 200 and the present invention.

The storage unit 210 comprises a memory 225 and optionally, a processor 230. The memory 225 is used for storing the configuration information and the security keys and any other type of information deemed necessary. The processor 230 can be used to provide an encryption function to the device 200 to help protect the contents of the device 200. Additionally, the processor 230 can be used to limit access to certain specified users and wireless stations or the processor 230 can limit the number of times the configuration is retrieved from the device 200. If the processor 230 is not present in the device, then some of the added functionality such as encryption and access control are not available, unless the installation/update software executing on the personal computer supports the added functionality and performs the functionality. However, if the encryption and access control is performed by the installation/update software, then the level of security provided is not as high as if they were performed by the processor 230.

According to a preferred embodiment of the present invention, the configuration information may be downloaded (or programmed onto) the device 200 by a device programmer (not shown). The device programmer would be able to couple to the device 200 via a preferred connection mechanism, typically, the same connection mechanism (the connector 215) that is used to couple the device 200 to the personal computer. Once the device 200 is coupled to the device programmer, the configuration information and/or encryption keys and any other type of information can be downloaded onto the device 200. The device programmer may be a computer (or some other digital device) used by an installer or a network administrator.

According to a preferred embodiment of the present invention, the connector 215 is preferably a Universal Serial Bus (USB) connector. However, any other type of connector that can provide connectivity and exchange of information between a personal computer and the device 200 is also operable. Other examples of connectors include, but are not limited to: IEEE 1394 (FireWire), serial data connectors, parallel data connectors, Apple Desktop Bus (ADB) connectors, Small Computer System Interface (SCSI) connectors, etc.

According to another preferred embodiment of the present invention, the connector 215 and the cable 220 are replaced by a wireless connection. The wireless connection would negate the need to use physical connectors to connect the device 200 to a personal computer. The connector 215 and the cable 220 are replaced by a wireless transmitter and receiver pair, the pair is commonly referred to as a transceiver. Examples of wireless connections include, but are not limited to: radio frequency (RF), infrared, laser light emitting diodes, laser, microwave, etc.

Referring now to FIG. 3, a diagram illustrates a device 300 for physically exchanging configuration information in a wireless network according to a preferred embodiment of the present invention. Internally, device 300 is similar to device 200 (FIG. 2) in that it has a memory 325 for storing information and a processor 330 (optional) for providing additional functionality support. However, rather than connecting to a personal computer via a cable or wireless connection, the device 300 features a special connector 315 that adheres to a common computer interface specification. For example, the connector 315 may be a PC Card interface connector (formerly known as PCMCIA), any one of the many memory storage device interfaces, such as Memory Stick, SanDisk, Compact Flash, CF Flash, Smart Media, Secure Digital, MultiMedia Card (MMC), NAND Flash, etc., or a proprietary memory interface.

Referring now to FIG. 4, a flow diagram 400 displays a sequence of steps involved in changing a set of security keys for a wireless network according to a preferred embodiment of the present invention. FIG. 4 displays the sequence of steps under the assumption that wireless stations in the wireless network are already properly configured and operational. The sequence 400 begins when a network administrator decides to change the security (WEP) keys for the wireless network (410). Depending on internal policies, the network administrator may be required to change the security keys at regular intervals or after detecting a security breach. Regardless of the case, the new security keys and other wireless network information are stored onto the device (420). As discussed previously, the information written to the device may be encrypted or encoded to reduce illicit distribution.

According to a preferred embodiment of the present invention, the network administrator may create a plurality of the devices to speed the distribution of the new security keys. After the network administrator creates the devices, the devices are distributed to users who need them (430). The user then simply inserts the device into a corresponding access port (440) on his/her personal computer. A preferred access method is through the personal computer's USB port, though, as discussed previously, there are many different ways of interfacing the device to the personal computer.

With the device connected to the personal computer, the personal computer is able to detect the presence of the device (450). Autodetection is a function of the particular type of access port used. For example, more advanced ports such as USB and IEEE 1394 ports can automatically detect a new device being connected to them. However, older legacy ports such as the standard serial and parallel ports cannot. According to another embodiment of the present invention, if the device interfaces to the personal computer through a port that does not support automatic detection of devices being connected to it, then the user is required to perform an additional step of executing a program that will initiate the data exchange sequence. This may be achieved by selecting the program to execute or by pressing a designated button on the personal computer or entering a particular key sequence on the personal computer's keypad.

However, if the port supports automatic detection of devices connected to it, then the personal computer will be able to detect the insertion of the device (450) and it will automatically execute a program designed to retrieve the information stored in the device. According to another preferred embodiment of the present invention, the device is linked to a single user and computer and access control will verify if the device is connected to the authorized computer before permitting the personal computer to retrieve the contents. As discussed previously, encryption and access control can be performed by a processor located inside the device or it may be performed by the installation/update software executing on the personal computer.

According to another preferred embodiment of the present invention, the configuration information on the device may be retrieved only one time (or a specified number of retrievals) and the device will allow only a single retrieval (or up to the specified number of retrievals) of the information stored on it. Any attempts at retrieving the information when the number of accesses has exceeded the allowed limit will fail.

After retrieving the information, the personal computer uses the information to configure the wireless station connected to the personal computer (460) and the personal computer resumes operation, using the newly supplied network information (470). The user can then return the device to the network administrator or pass it onto other users of the wireless network (480).

Referring now to FIGS. 5*a-d*, diagrams illustrate different embodiments of the present invention. FIG. 5*a* displays a preferred embodiment of the present invention, wherein a personal computer 505 is coupled to a wireless station 507. FIG. 5*a* displays the wireless station 507 as being external to the personal computer 505. However, in most applications the wireless station 507 is a computer card that fits inside a slot in the personal computer 505. In some applications, the wireless station 507 is actually integrated into the personal computer 505. The wireless station 507 is only shown to be external to the personal computer 505 to show that in the majority of instances, the personal computer 505 and the wireless station 507 are separate entities. A device 509 that contains configuration information interfaces to the personal computer 505 through an interface slot 511. The interface slot 511 can be, but is not limited to: a PC Card interface (formerly known as a PCMCIA interface), a memory storage device interface, such as Memory Stick, Compact Flash, CF Flash, SanDisk, Smart Media, Secure Digital, MultiMedia Card (MMC), NAND Flash, etc., or some proprietary memory interface built into the personal computer 505. Alternatively, the device 509 may be as simple as a floppy disk, a compact disk, or any other type of removable magnetic/optical media that is capable of containing the configuration information.

Figure 5B:
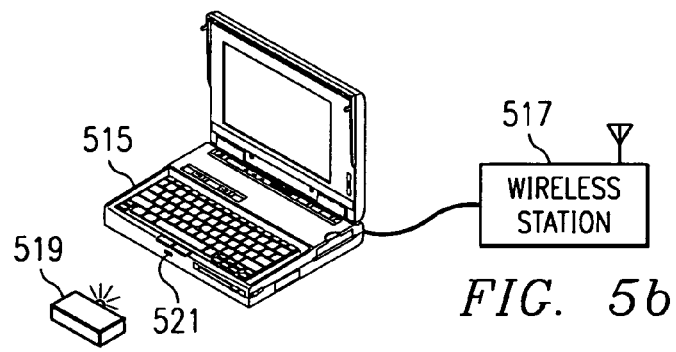

Referring now to FIG. 5b, a diagram illustrates another preferred embodiment of the present invention. FIG. 5b illustrates a personal computer 515 being coupled to a wireless station 517. A device 519 containing configuration information is transferring its information to the personal computer through some wireless connection. The personal computer 515 has a wireless transceiver 521 that is capable of receiving and transmitting information to and from the device 519. The personal computer 515 and the device 519 may use, but is not limited to, any of the following wireless communications methods: radio frequency (RF), microwave, infrared, laser, etc.

Figure 5C:
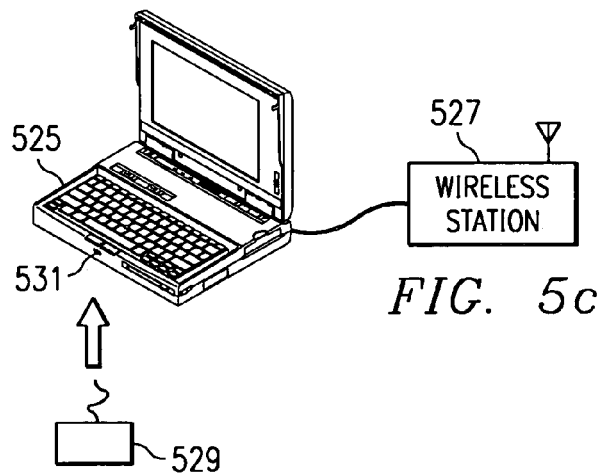

Referring now to FIG. 5c, a diagram illustrates yet another preferred embodiment of the present invention. FIG. 5c illustrates a personal computer 525 being coupled to a wireless station 527. A device 529 containing configuration information is coupled to the personal computer via a wired connection through a port 531 on the personal computer 525. Examples of computer ports that may be used for communicating between the personal computer 525 and the device 529 include, but are not limited to: USB ports, IEEE 1394 ports, serial data ports, parallel data ports, SCSI ports, and any type of proprietary data port.

Figure 5D:
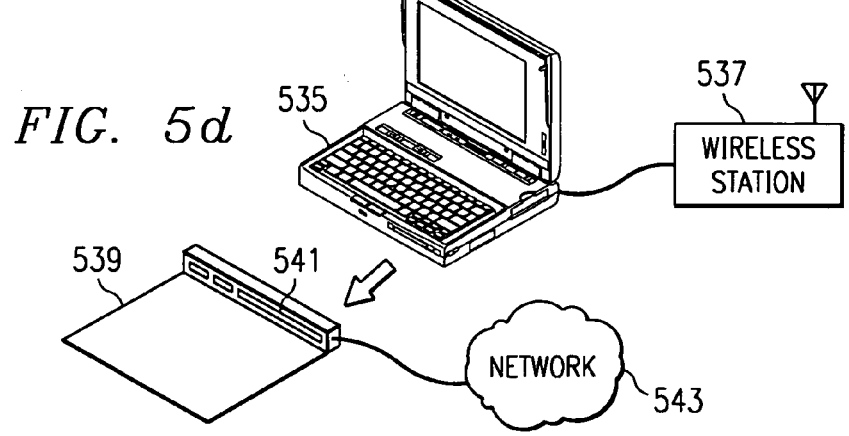

Referring now to FIG. 5d, a diagram illustrates another preferred embodiment of the present inventions. Previous described preferred embodiments have involved the use of some connection between a personal computer and a device that requires that the personal computer have a matching and compatible connection. FIG. 5d displays a preferred embodiment wherein a personal computer 535, being coupled to a wireless station 537 is not required to possess any type of compatible connection at all. Rather than requiring the personal computer 535 possess a compatible connection, there is a docking station 539, to which the personal computer 535 may connect. There is some connectivity provided between the personal computer 535 and the docking station 539 through the use of a connector(s) 541. Also coupled to the docking station is a network 543. The connection between the docking station 539 and the network 543 may be via one of many various types of network connections, such as a direct-connect local area network connection, a high-speed digital connections such as a digital subscriber line or a cable modem line, a dial-up modem connection, or even a high-speed wireless connection.

When the personal computer 535 is connected to the docking station 539 and the connections 541 are made, the personal computer 535 can begin downloading the configuration information stored somewhere on the network 543. An advantage of this preferred embodiment is that there are no devices that require updating and distributing. A company may have several such docking stations strategically located through out the office space and users can periodically insert their personal computer to retrieve configuration information updates.

An alternative embodiment to FIG. 5d exists wherein the docking station is not connected to a network, but it is connected to or contains therein a device (similar to such devices discussed previously) that contains the updated configuration information. Upon insertion of the personal computer, the updated configuration information may be retrieved.

In the discussion of preferred embodiments of the present invention, the term personal computer has been used exclusively. The term personal computer is used to represent a wide array of different computers, ranging from the classical desktop personal computer to the portable laptop, from pen-based computers to personal digital assistants, from smart cellular telephones to palm sized organizers. Basically, the term personal computer can represent any digital device that can take advantage of a digital wireless network connection to distribute information and/or multimedia content.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for physically exchanging wireless network configuration information in a wireless communications network comprising:
   saving the wireless network configuration information to a device;
   coupling the device to one of a plurality of wireless stations within the wireless communication network;
   verifying that the wireless station is a desired recipient of the configuration information;
   initiating the downloading of the wireless network configuration information from the device to the wireless station if the wireless station is the desired recipient of the configuration information;
   preventing the downloading of the wireless network configuration information if the wireless station is not the desired recipient of the configuration information; and
   using the wireless network configuration information to configure the wireless station if the wireless station is the desired recipient of the configuration information, wherein a user has possession of the device.

2. The method of claim 1, wherein the configuration information is encrypted prior to being written to the device.

3. The method of claim 1, wherein the configuration information is encrypted after being written to the device.

4. The method of claim 1, wherein the coupling step comprises inserting the device into a compatible slot on a computer coupled to the wireless station.

5. The method of claim 1, wherein the coupling step comprises connecting a cable on the device to a compatible slot on a computer coupled to the wireless station.

6. The method of claim 1, wherein the coupling step comprises initiating a wireless communications link between the device and a computer coupled to the wireless station.

7. The method of claim 1, wherein the initiating step comprises a computer automatically detecting the presence of the device.

8. The method of claim 1, wherein the initiating step comprises pressing a designated button on a computer coupled to the wireless station.

9. The method of claim 1, wherein the initiating step comprises entering a particular key sequence on a keypad of a computer coupled to the wireless station.

10. The method of claim 1, further comprising:
selectively repeating the steps of coupling, verifying, initiating, and using for each one of the plurality of wireless stations requiring the configuration information.

11. The method of claim 1, wherein a limit on the number of times the configuration information can be downloaded has been placed on the device, and wherein the initiating step comprises:
reading from a memory, the number of times the configuration information has been downloaded;
comparing the number of times with the limit;
initiating the downloading of the configuration information if the number of times does not exceed the limit; and
preventing the downloading of the configuration information if the number of times does exceed the limit.

12. The method of claim 1, wherein the configuration information comprises security keys for an encryption system.

13. The method of claim 1, wherein the using step comprises:
reading the configuration information;
applying the configuration information to the wireless station; and
reinitializing the wireless station with the configuration information.

14. A system for physically exchanging wireless network configuration information for a plurality of wireless stations in a wireless network comprising:
a portable device for storing the wireless network configuration information and distributing same, the device comprising
a memory for storing the wireless network configuration information; and
a connector for coupling the portable device to a wireless station; and
a device programmer for writing the wireless network configuration information to the portable device, the device programmer containing circuitry to write the wireless network configuration information to the memory of the portable device when the portable device is coupled to the device programmer, wherein the portable device is configured to
verify that the wireless station is a desired recipient of the wireless network configuration information;
initiate the downloading of the wireless network configuration information from the portable device to the wireless station if the wireless station is the desired recipient of the configuration information; and
prevent the downloading of the wireless network configuration information from the portable device to the wireless station if the wireless station is not the desired recipient of the configuration information.

15. The system of claim 14, wherein the portable device further comprises a processor coupled to the memory, the processor containing circuitry to provide encryption and access limitations to the configuration information stored in the portable device.

16. The system of claim 15, wherein the processor encrypts the configuration information prior to storing the configuration information into the memory.

17. The system of claim 14, wherein the connector is a Universal Serial Bus (USB) port.

18. The system of claim 14, wherein the connector is a wireless transceiver.

19. The system of claim 14, wherein the connector is a PC Card interface.

20. The system of claim 14, wherein the portable device is further configured to:
read from the memory, the number of times the configuration information has been downloaded;
compare the number of times with a predetermined limit;
initiate the downloading of the configuration information if the number of times does not exceed the predetermined limit; and
prevent the downloading of the configuration information if the number of times does exceed the predetermined limit.

21. A method for exchanging wireless network configuration information in a wireless communications network comprising:
coupling a device to one of a plurality of wireless stations within the wireless communications network, wherein the wireless station is configured with a first wireless network configuration information and the device includes a second wireless network configuration information;
verifying that the wireless station is a desired recipient of the second wireless network configuration information;
initiating the downloading of the second wireless network configuration information from the device to the wireless station if the wireless station is the desired recipient of the second configuration information; and
configuring the wireless station using the second wireless network configuration information if the wireless station is the desired recipient of the second configuration information.

22. The method according to claim 21, wherein the coupling step comprises inserting the device into a compatible slot on the wireless station.

23. The method according to claim 21, wherein the coupling step comprises coupling a cable on the device to a compatible slot on the wireless station.

24. The method according to claim 21, further comprising:
selectively repeating the steps of coupling, verifying, initiating, and configuring for each one of the plurality of wireless stations requiring the second configuration information.

25. The method according to claim 21, wherein a limit on the number of times the second configuration information can be downloaded from the device has been placed on the device, and wherein the initiating step comprises:
determining the number of times the second configuration information has been downloaded from the device; and
initiating the downloading of the second configuration information if the number of times does not exceed the limit, and preventing the downloading of the second configuration information if the number of times does exceed the limit.

26. The method according to claim 21, wherein the second configuration information comprises security keys for an encryption system.

27. The method according to claim 21, wherein the configuring step comprises:

reading the second configuration information from the device;

applying the second configuration information to the wireless station; and reinitializing the wireless station with the second configuration information.

* * * * *